United States Patent [19]

Tomikawa et al.

[11] Patent Number: 4,928,019
[45] Date of Patent: May 22, 1990

[54] SYSTEM FOR COMPENSATIVELY CORRECTING FOR DISPLACEMENTS DUE TO HEAT IN MACHINE TOOLS

[75] Inventors: Kazuto Tomikawa, Mishima; Hideo Fujie, Nagaizumi, both of Japan

[73] Assignee: Toshiba Kikai Kabushiki Kaisha, Tokyo, Japan

[21] Appl. No.: 23,252

[22] Filed: Mar. 9, 1987

[30] Foreign Application Priority Data

Mar. 12, 1986 [JP] Japan .................................. 61-53982

[51] Int. Cl.$^5$ ............................................. G01N 21/86
[52] U.S. Cl. ...................................... 250/561; 356/400; 901/47
[58] Field of Search ................. 250/561; 356/141, 152, 356/400, 401; 901/47

[56] References Cited

U.S. PATENT DOCUMENTS

| | | | |
|---|---|---|---|
| 4,453,085 | 6/1984 | Pryor | 250/203 R |
| 4,602,163 | 7/1986 | Pryor | 250/561 |
| 4,698,491 | 10/1987 | Lysen | 250/561 |

FOREIGN PATENT DOCUMENTS

88/00327 1/1988 PCT Int'l Appl. ................. 356/152

*Primary Examiner*—David C. Nelms
*Assistant Examiner*—Stephone B. Allen
*Attorney, Agent, or Firm*—Stevens, Davis, Miller & Mosher

[57] ABSTRACT

Relative displacement of parts of a machine tool caused by thermal deformation is compensatively corrected for by a correction system comprising a diffused light source mounted near the main spindle of the machine tool for holding a machining tool, a lens mounted apart from the light source on the table which is moveable relative to the main spindle and functions to hold a workpiece, a light spot displacement detector for detecting variation of position of a light source image formed by the lens and generating a corresponding detection signal, and a control means operating to compute, from this signal, any relative displacement of the table and the light source and, on the basis of this relative displacement, to correct the relative position of the table and the main spindle.

9 Claims, 13 Drawing Sheets

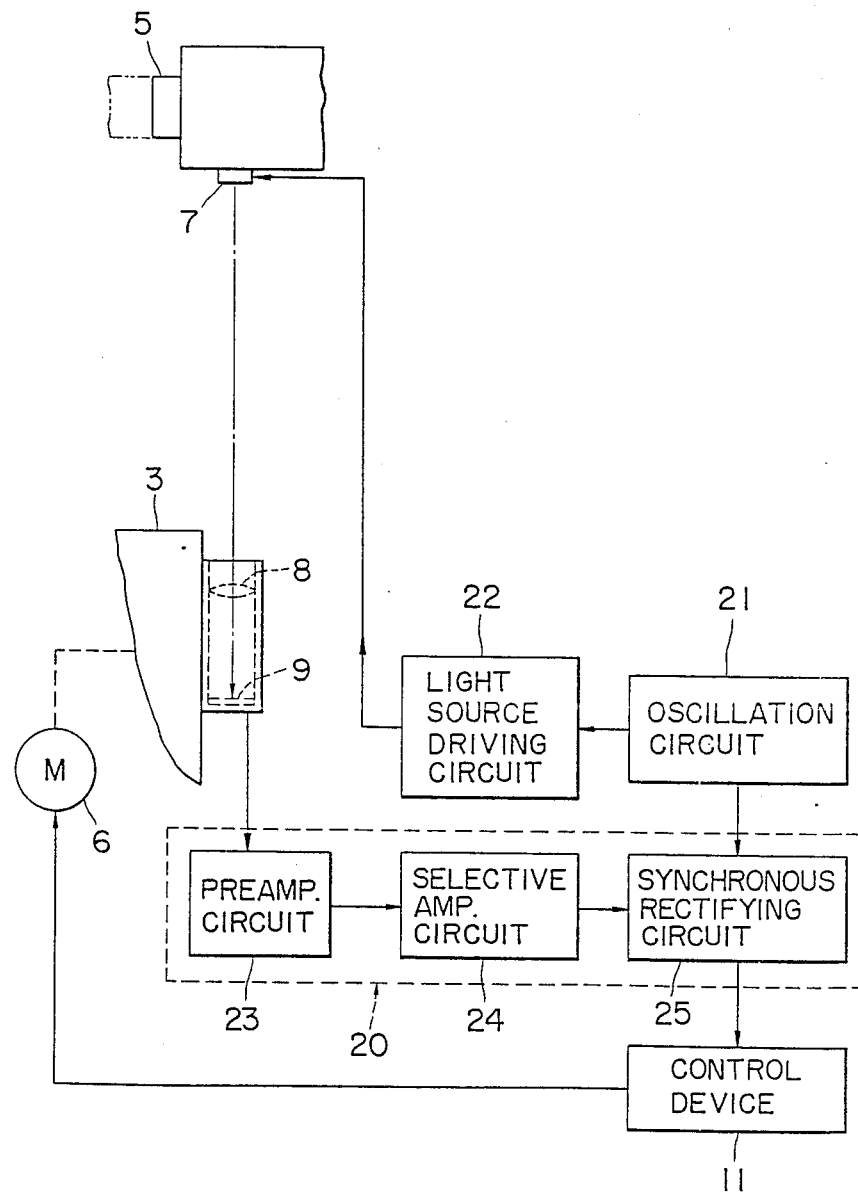
F I G. 5

SYSTEM FOR COMPENSATIVELY CORRECTING FOR DISPLACEMENTS DUE TO HEAT IN MACHINE TOOLS

BACKGROUND OF THE INVENTION

This invention relates generally to machine tools and methods and means for attaining machining precision therein and more particularly to a system for compensatively correcting for thermal displacement which corrects machining errors due to thermal deformation in machine tools, and which can be utilized in machine tools of a general type.

Among the various kinds of machine tools, there are several of the type, such as a milling machine or a machining center, which is provided with a main spindle head having a main spindle on which a tool is to be mounted, a column on which the main spindle head is supported in a manner permitting it to ascend and descend, and a table on which a workpiece to be machined by the tool is mounted and held. In general, in a machine tool of this type, the principal cause of machining error is the relative displacement due to variations in the relative positional relationship between the main spindle holding the tool and the table.

This relative displacement occurs because of the following circumstances. In the essential structural members and mechanisms intervening between the main spindle and the table, such as the main spindle head, the column, a bed, a saddle, the table, and ball screws, the temperature distribution is generally not uniform and gives rise to uneven thermal expansions of these various parts, which thereby undergo mutually different elongation or contraction, warping, and deformation, resulting in the relative displacement, which is further increased by the compounding of these irregular deformations.

From the past, in order to prevent machining errors due to such causes, various measures such as measure with respect to the heat source itself which is the cause of thermal deformation and measures for compensation and correction according to measurements of the thermal deformations have been devised and practiced.

In one example of the former measure, lubrication oil which has been temperature controlled is circulated through heat generating parts or parts whose temperatures are expected to rise thereby to absorb heat and suppress temperature rise. In another example of the former measure, the machine is so assembled that its precision will be maintained at the temperature of its machining operation, and, prior to entering into an actual machining operation, the machine is put through a warm-up run. While methods of this character may be effective as measures for suppressing thermal displacement within certain ranges, they are not basic solutions of the problem of thermal displacement. More specifically, as the machines progressively become larger and more complex, even slight temperature variations have a great influence on their machining precision, and it is impossible to maintain the machining precision at a constant level of an order which is unaffected by the temperature or temperature gradient of the machine. Furthermore, an attempt to reduce the temperature variation as much as possible will give rise to the necessity of using expensive equipment such as an accurate temperature control system and a large-capacity heat exchanger.

An example of the latter of the above mentioned measures is a method which comprises detecting the quantity of thermal deformation of the column by means of an electric level and correcting the error component of the position of the main spindle according to the quantity thus detected. However, an electric level has as its reference the gravitational direction, which is a reference outside of the machine body. For this reason, a plurality of levels are necessary, and the operational processing becomes complicated. Further, depending on the position of the main spindle, it is necessary to convert the correction amount each time. Another example of the latter measure comprises providing a reference plate within the column, detecting any deviation between the reference plate and the column by means of a differential transformer, and correcting the position of the main spindle. By this method, however, since the reference plate is provided within the column, the construction becomes complicated. Moreover, since the reference plate and the detecting element are continually in contact and undergoing mutual sliding movement, there is a possibility of development of errors in the detected values due to frictional abrasion of the detecting element during machining.

In addition, as an improvement of the latter measure, there is a method which, as disclosed in Japanese Patent Publication No. 8177/1985, comprises detecting displacement quantity by means of an optical device, operating a compensation device of improved precision and simplified construction in response to the detection signals thus obtained, and compulsorily correcting the displacement quantity by means of a heating device.

This is a thermal displacement correction system for a machine tool which, for correcting displacement in the column arising from inclination of the column, comprises a light source of the optical device and a reflecting mirror disposed apart from and facing this light source, both being disposed at specific positions on the column centerline, a light point displacement detector which is disposed on a column reference surface perpendicular to the column centerline at the base part of the column, and which detects displacement of a beam of light emitted by the light source and reflected by the mirror and generates a displacement detection signal, a computing device for receiving this detection signal as input and computing the displacement of the column from the reference surface to the main spindle to produce an output signal, and a correction circuit for operating in response to this output signal and a signal from a numerical control system to shift and adjust the position of the table and to correct the position of the main spindle.

In this case, the light from the light source is in the form of a light beam, and the displacement of the mirror is detected by the light point displacement detector. The corrective results of this method are sensitively influenced by shimmering or flickering due to air, and problems arise in measurement accuracy. Furthermore, when thermal displacement of the structure on which the light source is mounted occurs with variation of the temperature of the surroundings, minute angular variations of the light source are directly magnified and become a source of measurement errors. A fundamental inadequacy of this method is that, when correction is carried out by determining displacement due to deformation of only the column, it is merely correcting one part of the essential structure which gives rise to machining error and does not constitute a sufficiently satisfactory measure for eliminating machining errors.

SUMMARY OF THE INVENTION

It is an object of this invention to provide a system for correcting displacements due to heat in a machine tool capable of detecting directly displacements in the relative positional relationship between the main spindle and the table of the machine tool and, on the basis of the displacements thus detected, correcting accurately and positively the relative positional relationship.

The aforedescribed difficulties and problems encountered in the prior art have been overcome by this invention which provides a correction system of the following organization and operation.

According to this invention, briefly summarized, there is provided a correction system for compensatively correcting for thermal displacement in a machine tool of the type having a column, a main spindle head ascendably and descendably supported on the column, a main spindle rotatably supported on the main spindle head and having means for holding a machining tool, and a table for holding a workpiece to be machined by the tool, said correction system comprising: a light source mounted on the main spindle head in the vicinity of the main spindle and operating to emit diffused light; a lens mounted on the table in a state apart from and facing the light source and functioning to receive said diffused light and to form an image of the light source; a light point displacement detector for detecting variation of position of the light source image and generating a corresponding detection signal; an amplifying circuit for amplifying said detection signal; and a control means operating to compute, from the signal thus amplified, any relative displacement of the table and the light source and, on the basis of said relative displacement, to correct the relative position of the table and the main spindle.

In the thermal displacement correction system of the above organization and function, the diffused light from the light source passes through the lens and forms a light source image, which is detected by the light point or spot displacement detector. Then, in the case where the main spindle becomes displaced relative to the table, the light source mounted in the vicinity of the main spindle is also similarly displaced, as is also the light source image. The detector detects this displacement of the image and transmits a corresponding but weak detection signal, which is amplified by the amplifying circuit and sent to the control means. Then, on the basis of the ratio of the distance between the light source and the lens and the distance between the lens and the detector, and from detected displacement of the light source image, the displacement of the light source, that is, the relative displacement of the main spindle with respect to the table is computed, and a specific correction is carried out.

The nature, utility, and further features of this invention will be more clearly apparent from the following detailed description with respect to preferred embodiments of the invention when read in conjunction with the accompanying drawings, briefly described below.

BRIEF DESCRIPTION OF THE DRAWINGS

In the drawings:

FIG. 5 is a combination of a side elevation and diagrams similar to FIG. 1 illustrating the essential organization of a second example of the invention;

DETAILED DESCRIPTION OF THE INVENTION

Figure 1:
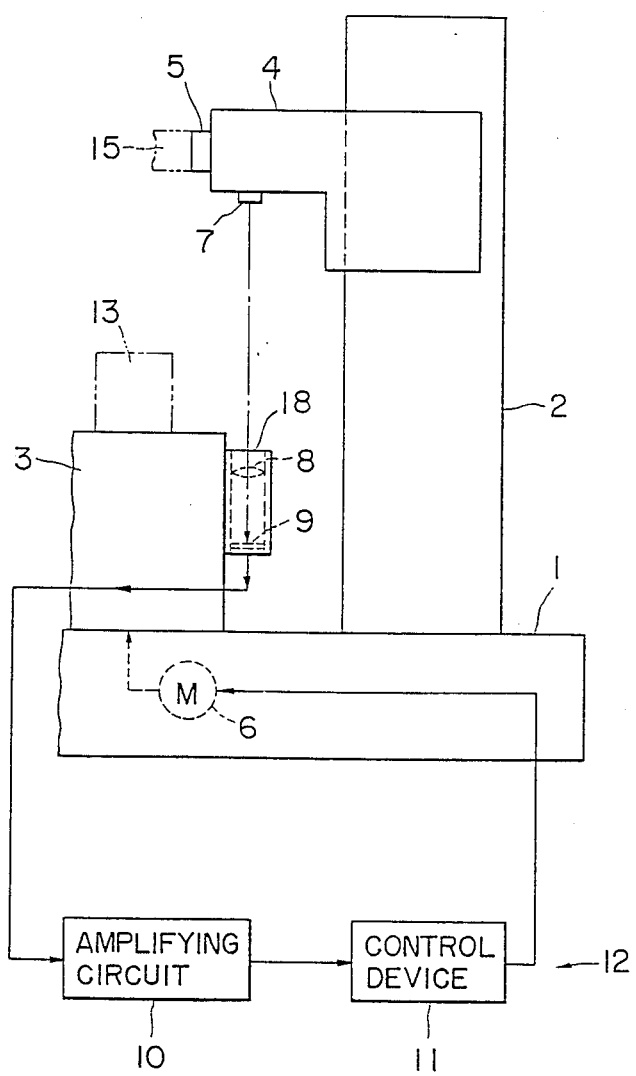
FIG. 1 is a combination of a simplified side elevation of a typical example of a machine tool to which this invention can be applied, and a schematic optical diagram and a block diagram illustrating the essential parts of a first example of the correction system according to the invention.
Figure 2:
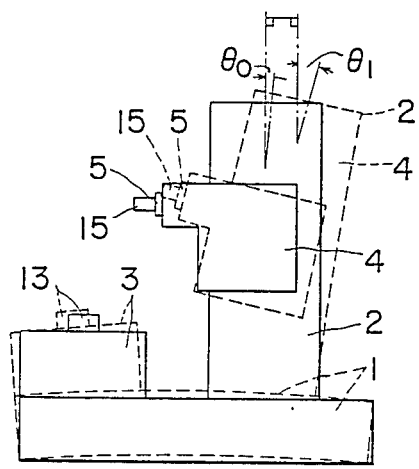
FIG. 2 is a simplified side elevation of the same machine tool indicating an example of thermal deformation thereof.

A representative example of a machine tool to which this invention can be advantageously applied is schematically illustrated in FIGS. 1 and 2. The normally immovable structural parts of this machine are a bed 1 fixed to the floor and a column 2 fixed at its lower base part to the bed 1 and standing upright therefrom. A table 3 is supported in a horizontally movable manner on the upper surface of the bed 1. On the column 2, a main spindle head 4 is slidably supported in a manner whereby it can be raised and lowered and can be fixed at a selected height by means not shown. This main spindle head 4 rotatably supports a horizontal main spindle 5, which is driven in rotation by driving means such as a motor (not shown) installed in the head 4 and is adapted to hold a tool 15 mounted thereon.

The table 3 is adapted to hold a workpiece 13 and is driven by way of a mechanism such as a ball screw shaft (not shown) by a servomotor 6 installed in the bed 1 and thereby can be moved along the upper surface of the bed 1 to any desired position within a specific range. Thus, three-dimensional machining is made possible by the combination of the vertical movement of the main spindle head 4 and the horizontal movements of the table 3, whereby the relative position of the workpiece 13 mounted on the table 3 and the tool 15 mounted on the main spindle 5 can be set with any desired configuration.

In a first and basic embodiment of this invention, as illustrated in FIGS. 1 through 4, a light source 7 for emitting diffused light downward is secured to a lower surface part of the main spindle head 4 in the vicinity of the main spindle. On a side face of the table 3 at a position separated from and confronting the light source 7, a light receiving cylinder 18 is mounted. This cylinder 18 is provided therein at its upper and lower parts, respectively, with a lens 8 for receiving the light emitted by the light source 7 and thereby forming an image of the light source and a light point displacement detector 9 capable of detecting positional variations of the light source image thus formed and generating corresponding detection signals.

These detection signals are transmitted to an amplifying circuit 10 and thus amplified and then fed to a control device 11, which is connected to the aforementioned servomotor 6 and to an operation command device (not shown) such as a control panel or an NC device. The servomotor 6 is operated by a command signal from the operation command device and thus causes the table 3 to move accordingly, whereby the machining operation of the machine tool is made possible. Furthermore, in the control device 11, the relative displacement of the table 3 and the main spindle 5 is computed on the basis of the detection signal from the light point displacement detector 9. Then, in the operation of the servomotor 6 in response to the command signal from the operation command device to cause the table 3 to move, the relative displacement is added to or subtracted from the quantity of movement, whereby compensative correction of the relative positional relationship between the table 3 and the main spindle 5 becomes possible. Thus, the light source 7, the lens 8, the light point displacement detector 9, the amplifying circuit 10, and the control device 11 constitute a thermal displacement correction device 12.

During machining, heat is generated by friction accompanying processes such as cutting and from the driving source such as a motor. As a consequence, as indicated in FIG. 2, the principal parts of the machine undergo deformations from the normal state as indicated by solid lines to a state of thermal deformation as indicated by intermittent lines, for example. As a result, a displacement in the relative positional relationship between the table 3 on which the workpiece 13 is mounted and the main spindle 5 on which the tool 15 is mounted occurs because of the accumulation or combination of thermal deformations occurring in the bed 1, the column 2 and the main spindle head 4, which are interposed between the table 3 and the main spindle 5.

Figure 3:
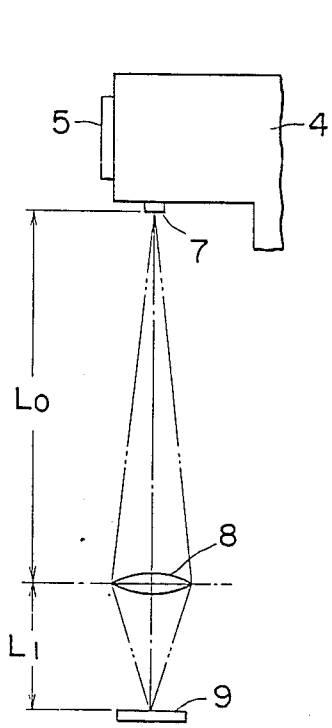
FIG. 3 is a partial side elevation of the main spindle head and the optical system of the correction system in normal state without deformation in the same machine tool.

In the case where the relative positional relationship between the table 3 and the main spindle 5 is normal as indicated in FIG. 3, the light from the light source 7 enters the light receiving cylinder 18 and, passing through the lens 8, forms an image of the light source at the central position on the light point displacement detector 9. With the machine and the optical part of the correction system in this normal state, the distance $L_0$ between the light source 7 and the lens 8, the distance $L_1$ between the lens 8 and the light point displacement detector 9, and the focal length F of the lens 8 have a mutual relation which can be expressed by the following equation:

$$\frac{1}{L_0} + \frac{1}{L_1} = \frac{1}{F} \qquad (1)$$

Figure 4:
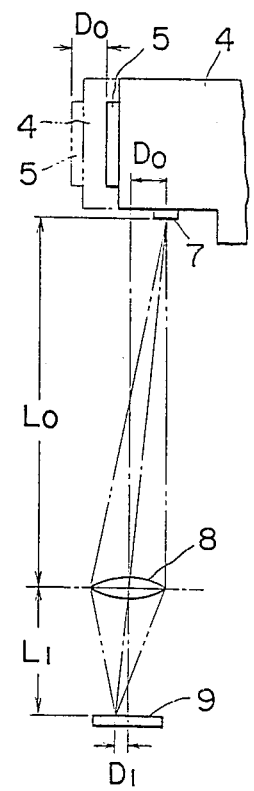
FIG. 4 is a view similar to FIG. 3 indicating the state of the same optical system when there is a thermal deformation in the machine tool.

When, as a consequence of thermal deformation of the machine parts, a horizontal displacement $D_0$ occurs in the relative positional relationship between the table 3 and the main spindle 5 as shown in FIG. 4, the image of the light source formed on the light point displacement detector 9 undergoes a horizontal displacement $D_1$ from the above mentioned central position. At this time, the relationship between $D_0$ and $D_1$ is as follows:

$$\frac{D_0}{D_1} = \frac{L_0}{L_1} \qquad (2)$$

Thus, by obtaining the values of the displacement $D_1$, the distance $L_0$, and the distance $L_1$, the value of the displacement $D_0$ can be determined. This determination is performed and utilized by the thermal displacement correction device 12 as follows.

The light point displacement detector 9 detects the displacement $D_1$ and transmits a corresponding output signal to the amplifying circuit 10, which amplifies this generally weak signal and sends the thus amplified signal to the control device 11. In the amplifying circuit 10, means may be provided to prevent illusionary light point positional variation due to light intensity, erroneous signals due to infiltration of light from the surroundings, effects of electrical noise signals, and other error-causing effects. In response to the signal from the amplifying circuit 10, the control device 11 computes the displacement $D_0$ as the relative displacement of the table 3 and the main spindle 5 and, in response to the command signal from the aforementioned operation command device, cause the table 3 to undergo corrective movement. That is, in this operation, by adjusting this movement of the table 3 on the basis of the above mentioned relative displacement, compensative correction of the relative position of the table 3 and the main spindle 5 is carried out.

In the practice of the instant example, by optically measuring and computing the displacement $D_0$ of the relative position of the light point displacement detector 9 provided on the table 3, on which the workpiece 13 is mounted, and the light source 7 fixed to the head 4 in the vicinity of the main spindle 5, on which the tool 15 is mounted, it becomes possible to detect directly the above mentioned relative displacement. Furthermore, by correcting the relative position on the basis of this relative displacement, precise and positive correction becomes possible, and machining with greatly improved accuracy becomes possible. Still another advantageous feature of the instant example is the mounting of the lens 8 and the light point displacement detector 9 in accommodated state within the light receiving cylinder 18 on the table 3, whereby erroneous operation of the light point displacement detector 9 due to infiltration of outside light and lowering of its accuracy in detecting the light source image can be prevented.

Figure 6:
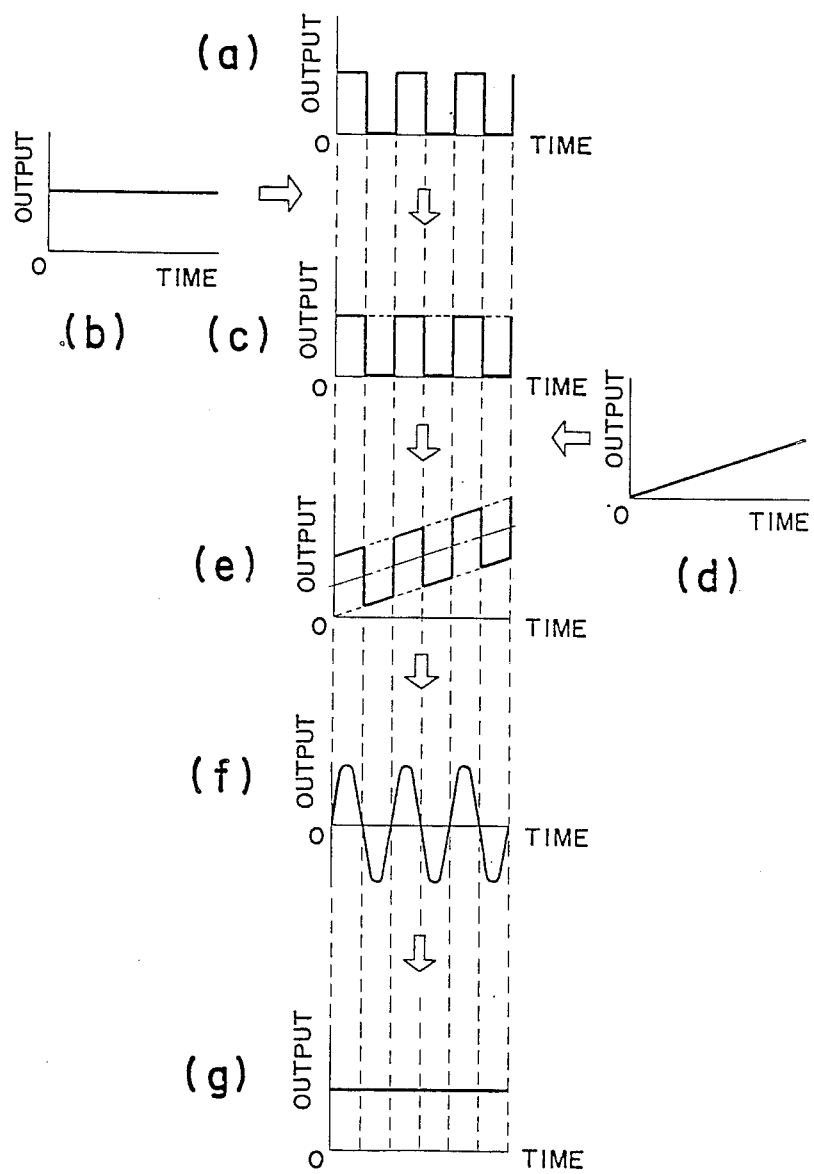
FIG. 6 is a graphical representation indicating relationships between signal outputs and time at various parts of the second example.

In a second embodiment of this invention as illustrated in FIGS. 5 and 6, the light source 7 is adapted to emit occulting or intermittent light, and errors in operation such as that due to infiltration of outside light is prevented.

In this example shown in FIG. 5, an oscillation circuit 21 outputs a synchronizing signal of a specific frequency and transmits it to a light source driving circuit 22, which operates in response to this synchronizing signal to cause the light source 7 to emit light occulting with the specific frequency. The occulting light is formed by a lens 8 as a light source image on a light point displacement detector 9, which operates in response to any detected displacement of the light source image to transmit a corresponding signal to an amplifying circuit 20. This amplifying circuit 20 comprises a preamplifying circuit 23 for amplifying the weak output signal from the light point displacement detector 9 to produce an amplified output signal, a selective amplifying circuit 24 for selectively amplifying only the component of the above mentioned specific frequency of this amplified output signal of the preamplifying circuit 23, and a synchronous rectifying circuit 25 for rectifying only that component which is in timewise synchronous relation to the above mentioned synchronizing signal sent from the oscillation circuit 21 of the output signal from the selective amplifying circuit 24 and transmitting its output to a control device 11.

In this example of the invention provided with the amplifying circuit 20 of the above described organization, the light source 7 is caused to emit occulting or intermittent light in accordance with a synchronizing signal as indicated in FIG. 6(a). The output signal from the light point displacement detector 9 when a displacement $D_0$ occurs at the light source 7 is as indicated in FIG. 6(b) in the case where the light source 7 is not being caused to emit occulting light, but, in the case where the light source 7 is emitting occulting light and there is no infiltration of outside light, it becomes as indicated in FIG. 6(c).

Then, in the case where outside light is infiltrating to cause the light point displacement detector 9 to generate an output signal as indicated in FIG. 6(d), for example, the output signal from the detector 9 becomes as indicated in FIG. 6(e). However, only the component of the specific frequency corresponding to the aforementioned synchronizing signal is selectively amplified by the selective amplifying circuit 24 and rendered into an output signal as indicated in FIG. 6(f). In addition, only the component in timewise synchronous relationship with the synchronizing signal is rectified by the synchronous rectifying circuit 25 and rendered into an output signal as indicated in FIG. 6(g). For this reason, when the displacement $D_1$ is determined by computation in the control device 11, this displacement $D_1$ assumes a proportional relationship to the displacement $D_0$, and the displacement $D_0$ can be determined accurately and positively from the displacement $D_1$ even when there is infiltration of outside light. Thus, in addition to the effectiveness of the preceding first embodiment of the invention, the influence of outside light is prevented, and an even more positive correction can be carried out.

Figure 7:
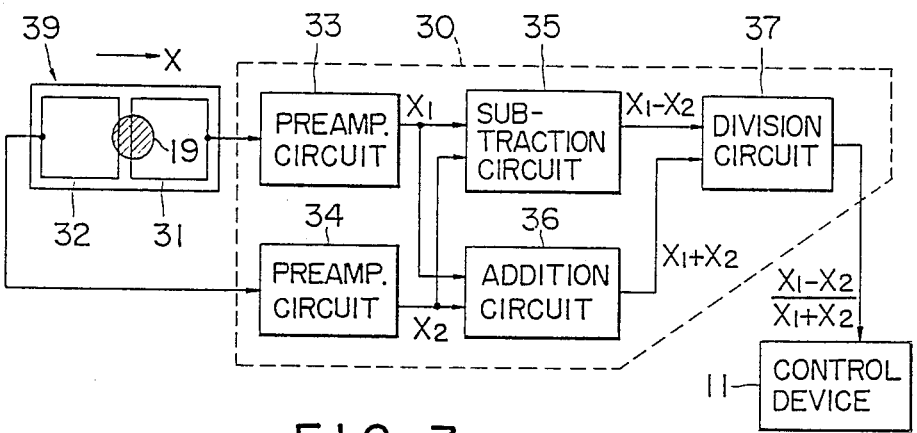
FIG. 7 is a combination of a plan view and a block diagram showing the essential organization of a third example of the invention.

In a third embodiment of the invention as illustrated in FIG. 7, a light point displacement detector 39 comprising two photodiodes 31 and 32 is used as a photodiode light point displacement detector of divided type, the detecting surface of which for detecting the light point position of the light source image 19 is divided. The detection output from this detector 39 is processed by an amplifying arithmetic circuit 30, which comprises a pair of preamplifying circuits 33 and 34, a subtraction circuit 35, an addition circuit 36, and a division circuit 37. In other respects, the organization of this example is the same as that of the first example.

In this example, the photodiodes 31 and 32 are alined in the direction of displacement of the light source image 19, as indicated by the arrow X. As in the preceding examples, light from a light source 7 is passed through a lens 8 and projected on the light point displacement detector 39 to form the light source image 19 thereon. Displacement of this image 19 causes the photodiodes 31 and 32 to produce respective corresponding output signals, which are respectively amplified by the preamplifying circuits 33 and 34, which thereby produce outputs $X_1$ and $X_2$, respectively. Both of these outputs $X_1$ and $X_2$ are supplied to the subtraction circuit 35 and to the addition circuit 36. In the subtraction circuit 35, the output $(X_1-X_2)$ obtained by subtracting the output $X_2$ from the output $X_1$ is calculated, while in the addition circuit 36, the output $(X_1+X_2)$ obtained by adding the outputs $X_1$ and $X_2$ is calculated.

In this case, the above output $(X_1-X_2)$ based on the difference in the outputs of the photodiodes 31 and 32, in general, is proportional to the displacement in the X direction of the light source image 19 but in some cases may vary as a consequence of increase or decrease in the light intensity of the light passing through the lens 8 and being projected on the detector 39 even when the light source image 19 is at the same position. For this reason, by dividing the output $(X_1-X_2)$ by the output $(X_1+X_2)$ based on the total quantity of the incident light in the division circuit 37, the output $(X_1-X_2)/(X_1+X_2)$ indicating the position of the light source image 19 can be calculated a the ratio of the difference between the outputs of the photodiodes 31 and 32 always under the same condition irrespective of the magnitude of the incident light intensity. This output thus calculated is fed into the control device 11 to carry out correction of the position of the table 3. In the operation of this example of the correction system, the precise position of the light source image 19 can be detected even when the light intensity of the incident light passing through the lens 8 varies, whereby an even more accurate and positive correction can be accomplished.

Figure 8:
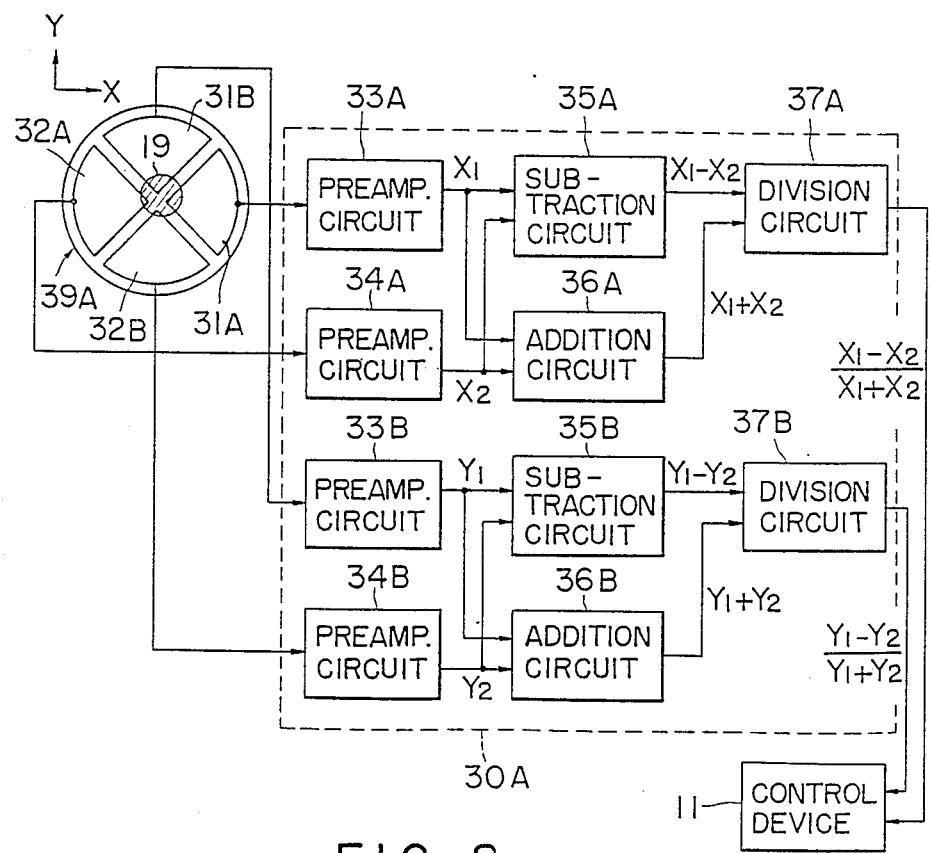
FIG. 8 is similar to FIG. 7 and shows the essential organization of a fourth example of the invention.

In a modification of the above described example constituting a fourth embodiment of the invention, as illustrated in FIG. 8, four photodiodes 31A, 31B, 32A, and 32B are arranged as 90-degree sectors of a circle to form a light point displacement detector 39A. The detection signals produced as output from these photodiodes 31A, 31B, 32A, and 32B are respectively sent to preamplifying circuits 33A, 33B, 34A and 34B in an amplifying arithmetic circuit 30A. In this amplifying arithmetic circuit 30A, the outputs $X_1$ and $X_2$ of the preamplifying circuits 33A and 34A are both fed into a subtraction circuit 35A and into an addition circuit 36A, while the outputs $Y_1$ and $Y_2$ of the preamplifying circuits 33B and 34B are both fed into a subtraction circuit 35B and into an addition circuit 36B. The outputs $(X_1-X_2)$ and $(X_1+X_2)$ of the subtraction circuit 35A and the addition circuit 36A are sent to a division circuit 37A, while the outputs $(Y_1-Y_2)$ and $(Y_1+Y_2)$ of the subtraction circuit 35B and the addition circuit 36B are sent to a division circuit 37B. The output $(X_1-X_2)/(X_1+X_2)$ of the division circuit 37A and the output $(Y_1-Y_2)/(Y_1+Y_2)$ of the division circuit 37B are fed into the control device 11. By this organization, the precise position of the light source image 19 can be detected not only in the X direction but also simultaneously in the Y direction perpendicular thereto.

Figure 9:
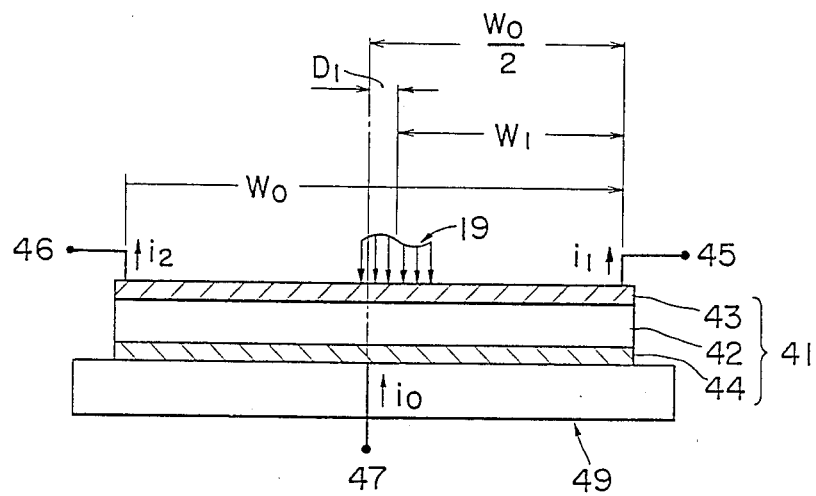
FIG. 9 is a sectional view showing the construction of a light point displacement detector used in a fifth example of the invention.
Figure 10:
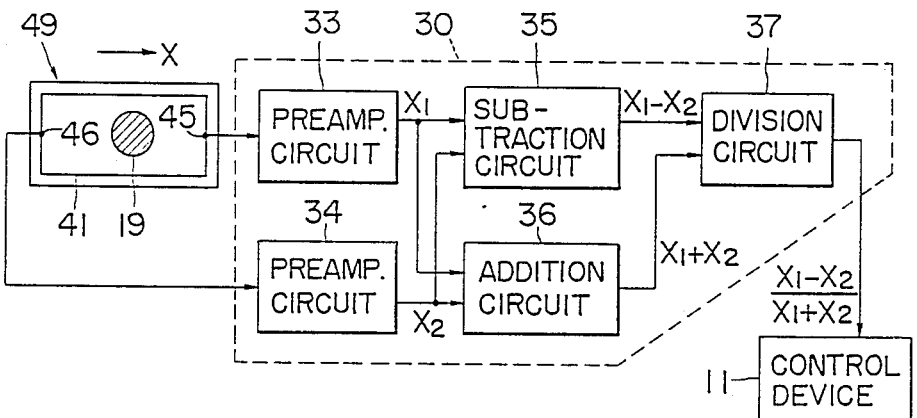
FIG. 10 is similar to FIG. 7 and illustrates the essential organization of the above mentioned fifth example.

In the above described third and fourth examples, light point displacement detectors wherein divided photodiodes form the surface for detecting the position of a light point are used. In a fifth embodiment of this invention as illustrated in FIGS. 9 and 10, a light point displacement detector 49 provided with a continuous type PIN photodiode 41 is used as a photodiode light point displacement detector of continuous type in which the surface for detecting the position of a light point is not divided. In the circuitry of this example, the amplifying arithmetic circuit 30 and other components are the same as those of the aforedescribed third example.

As shown in FIG. 9, the PIN photodiode 41 of the detector 49 comprises an I-type layer 42, a P-type resistance layer 43 formed on the outer surface of the I-type layer 42, and an N-type layer 44 formed on the reverse surface of the I-type layer 42. To the opposite ends of the P-type resistance layer 43 are respectively connected electrodes 45 and 46 spaced apart by a distance $W_0$. A common electrode 47 is connected to the central part of the N-type layer 44.

Then, when the center of the light source image 19 formed by the light from the light source 7 which has passed through the lens 8 is at a position which is at a distance $W_1$ from the electrode 45 of the P-type resistance layer and lies on a straight line between the electrodes 45 and 46, a current $I_0$ flows through the PIN photodiode 41 and the common electrode 47. In the case where, at this time, the distance $W_1$ is just one half the distance $W_0$, that is, the center of the light source image 19 is coincident with the exact center position of the light point displacement detector 49, the currents $I_1$ and $I_2$ flowing through the electrodes 45 and 46 are equal and can be represented by $I_1=I_2=I_0/2$. However, in the case where the light source image 19 is displaced from the central position, a current $I_1$ represented by the following equation (3) flows through the electrode 45.

$$I_1 = I_0 \times \frac{(W_0 - W_1)}{W_0} \quad (3)$$

while a current $I_2$ as given by the following equation (4) flows through the electrode 46.

$$I_2 = I_0 \times \frac{W_1}{W_0} \quad (4)$$

The output signals which can be derived respectively from the electrodes 45 and 46 produce an output difference corresponding to the displacement $D_1$ of the center of the image 19 from the above mentioned central position, the displacement $D_1$ being representable by $D_1=(W_0/2)-W_1$.

Referring to FIG. 10, the electrodes 45 and 46 of the detector 49 are respectively connected to the preamplifying circuits 33 and 34 of the amplifying arithmetic circuit 30. Then, by the same arithmetic operation as in the preceding third example, it becomes possible to detect accurately the true position of the image 19 irrespective of variation of the incident light intensity. Furthermore, according to this fifth example, a PIN photodiode 41 of continuous type is used in the detector 49 in order to detect the center position of the image 19, whereby, in comparison with the case wherein a photodiode 31 of divided type is used as described in connection with the preceding third example, a more accurate and positive correction can be accomplished without any influence due to the dimensions of the light source image 19.

Figure 14:
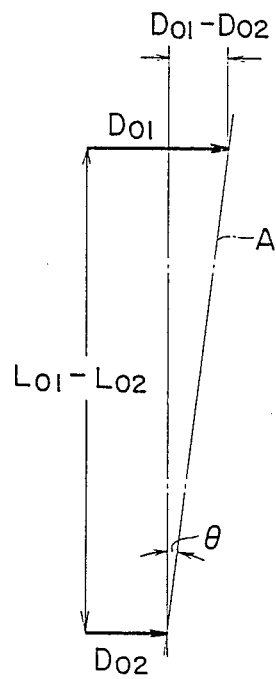
FIG. 14 is a geometric diagram indicating the principle of the same seventh example.
Figure 11:
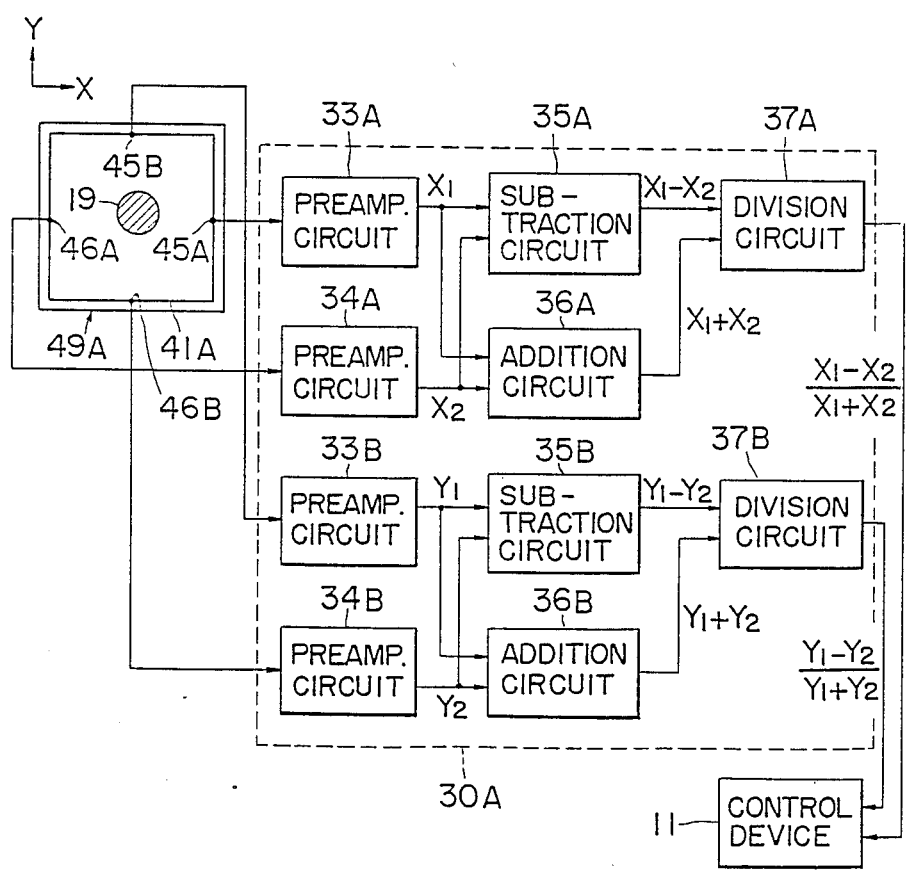
FIG. 11 is similar to FIG. 8 and shows the essential organization of a sixth example of the invention.

In a sixth example of the system of the invention as illustrated in FIG. 11, which is a modification of the preceding fifth example, the position of the light source image 19 is detected by a light point displacement detector 49A comprising a rectangular PIN photodiode 41A provided at its four peripheral sides with respective electrodes 45A, 45B, 46A, and 46B. The electrodes are connected to respective preamplifying circuits 33A, 33B, 34A, and 34B of the same amplifying arithmetic circuit 30A as in the fourth example described above and illustrated in FIG. 8. By this arrangement, any displacement of the center of the light source image 19 can be detected simultaneously with respect to two intersecting directions X and Y. In each of the foregoing examples, from the first to the sixth, only one combination of a lens 8 and a light point displacement detector 9 is used, and the relative displacement $D_0$ in a horizontal direction of the table 3 and the main spindle 5 is detected by the displacement $D_1$ of the detector 9 at the time when the main spindle head 4 is at a position satisfying the Equation (1) set forth hereinbefore, and correspondingly, appropriate correction is carried out. In a seventh example as illustrated in FIGS. 12, 13, and 14, by using a plurality of combinations of lenses and light point displacement detectors and detecting the relative displacement of the table 3 and the main spindle 5 at different positions and calculating the inclination of the axis in the up-and-down direction of the main spindle head 4, and by considering the variation of the displacement of the table 3 and the main spindle 5 accompanying movement of the main spindle head 4, an even more precise correction is made possible.

Figure 12:
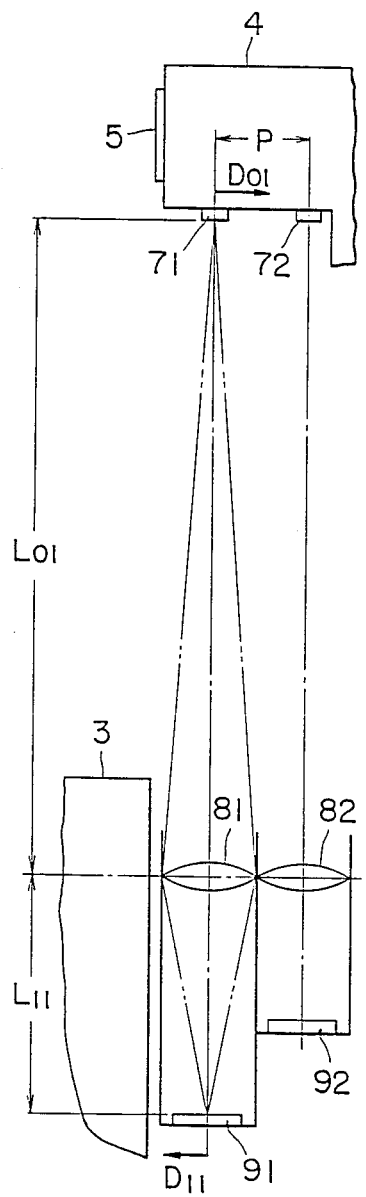
FIG. 12 is a view similar to FIG. 3 indicating a state of detection of a seventh example of the invention.
Figure 13:
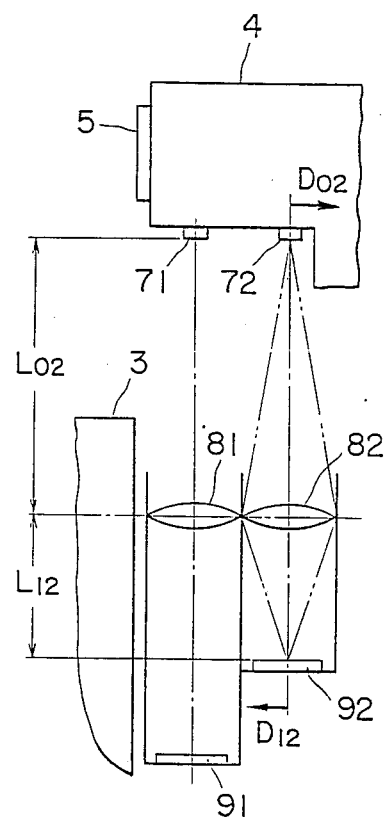
FIG. 13 is a view similar to FIG. 12 indicating another state of detection of the same seventh example.

Referring to FIGS. 12 and 13, two light sources 71 and 72 are mounted with a spacing of P on the main spindle head 4 in the vicinity of the main spindle 5.

Corresponding two lenses 81 and 82 and two light point position detectors 91 and 92 are mounted on a side face of the table 3 at positions to confront the light sources 71 and 72, respectively. For the following description, the distance between the lens 81 and its light point displacement detector 91 will be denoted by $L_{11}$, while the distance between the lens 82 and its detector 92 will be denoted by $L_{12}$.

Then, when the main spindle head 4 is at a position such that the distance between the light source 71 and the lens 81 is $L_{01}$ as indicated in FIG. 12, a light source image is formed on the detector 91. Then from the displacement $D_{11}$ of this image, the relative displacement of the table 3 and the main spindle 5 can be calculated from the following equation.

$$D_{01} = \frac{L_{01}}{L_{11}} \times D_{11} \tag{5}$$

On the other hand, when the main spindle head 4 is at a position such that the distance between the light source 72 and the lens 82 is $L_{02}$ as indicated in FIG. 13, a light source image is formed on the detector 92. Then from the displacement $D_{12}$, the relative displacement of the table 3 and the main spindle 5 can be determined from the following equation.

$$D_{02} = \frac{L_{02}}{L_{12}} \times D_{12} \tag{6}$$

Then, from these displacements $D_{01}$ and $D_{02}$ and the distances of the detection positions ($L_{01} - L_{02}$), the inclination $\theta$ of the axis A of the main spindle head 4 in the ascending and descending direction as shown in FIG. 14 can be obtained as follows.

$$\theta = \tan^{-1}\left(\frac{D_{01} - D_{02}}{L_{01} - L_{02}}\right) \tag{7}$$

Then by detecting the inclination $\theta_0$ of the axis when there is no thermal deformation as indicated by solid line in FIG. 2, for example, detecting the inclination $\theta_1$ of the axis when a thermal deformation occurs as indicated by broken line in FIG. 2, and calculating the variation $\Delta\theta = \theta_0 - \theta_1$ of the axis due to the thermal deformation, the magnitude of the relative displacement of the table 3 and the main spindle 5 accompanying the ascent or descent of the main spindle head 4 can be detected. Accordingly, the relative position of the table 3 and the main spindle 5 can be corrected with further fineness in conformance with the ascent and descent of the main spindle head 4, whereby an even more precise correction can be accomplished. It is to be noted that the number of the above described detection positions is not limited to two, but may be three or more, in which case an even more precise correction becomes possible in accordance with the vertical position of the main spindle head 4.

Figure 15:
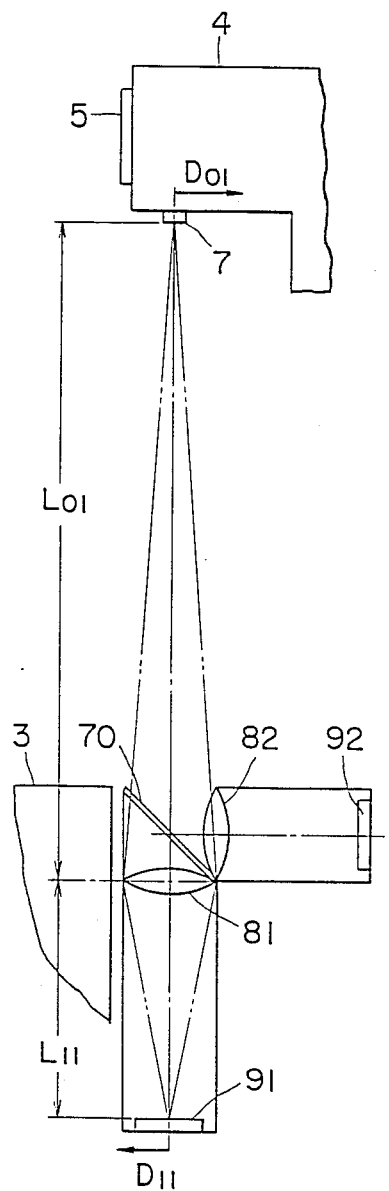
FIG. 15 is an optical diagram of an eighth example of the invention in a state of detection.
Figure 16:
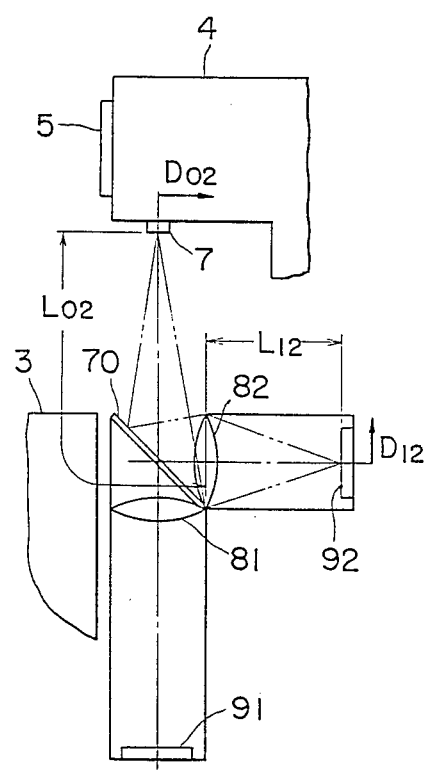
FIG. 16 is a diagram similar to FIG. 15 indicating another detection state of the same eighth example.

In an eighth example as illustrated in FIGS. 15 and 16, which is a modification of the above described seventh example, a first combination of a lens 81 and a light point displacement detector 91 and a second combination of a lens 82 and a light point displacement detector 92 are so mounted on a side face of the table 3 that their respective optical axes intersect perpendicularly. At the intersection of the optical axes, a half mirror 70 is so supported as to form a 45-degree angle with each of the optical axes. This half mirror 70 functions to divide the light from a single light source 7 mounted on the main spindle head 4 in the vicinity of the main spindle 5 into transmitted light and reflected light, which are respectively through the lenses 81 and 82 to form respective light source images on the detectors 91 and 92.

By the above described arrangement, it is possible to obtain the displacement $D_{01}$ from the distances $L_{01}$ and $L_{11}$ and the displacement $D_{11}$ according to the Equation (5) set forth hereinbefore, to obtain the displacement $D_{02}$ from the distances $L_{02}$ and $L_{12}$ and the displacement $D_{12}$ according to the Equation (6), and to obtain the inclination $\theta$ of the axis from the Equation (7). Therefore, the same effect as in the preceding seventh example can be obtained. Furthermore, only a single light source 7 is sufficient, whereby the system can be simplified, and, moreover, an error arising from the spacing P between the two light sources 71 and 72 in the preceding example can be eliminated.

Figure 17:
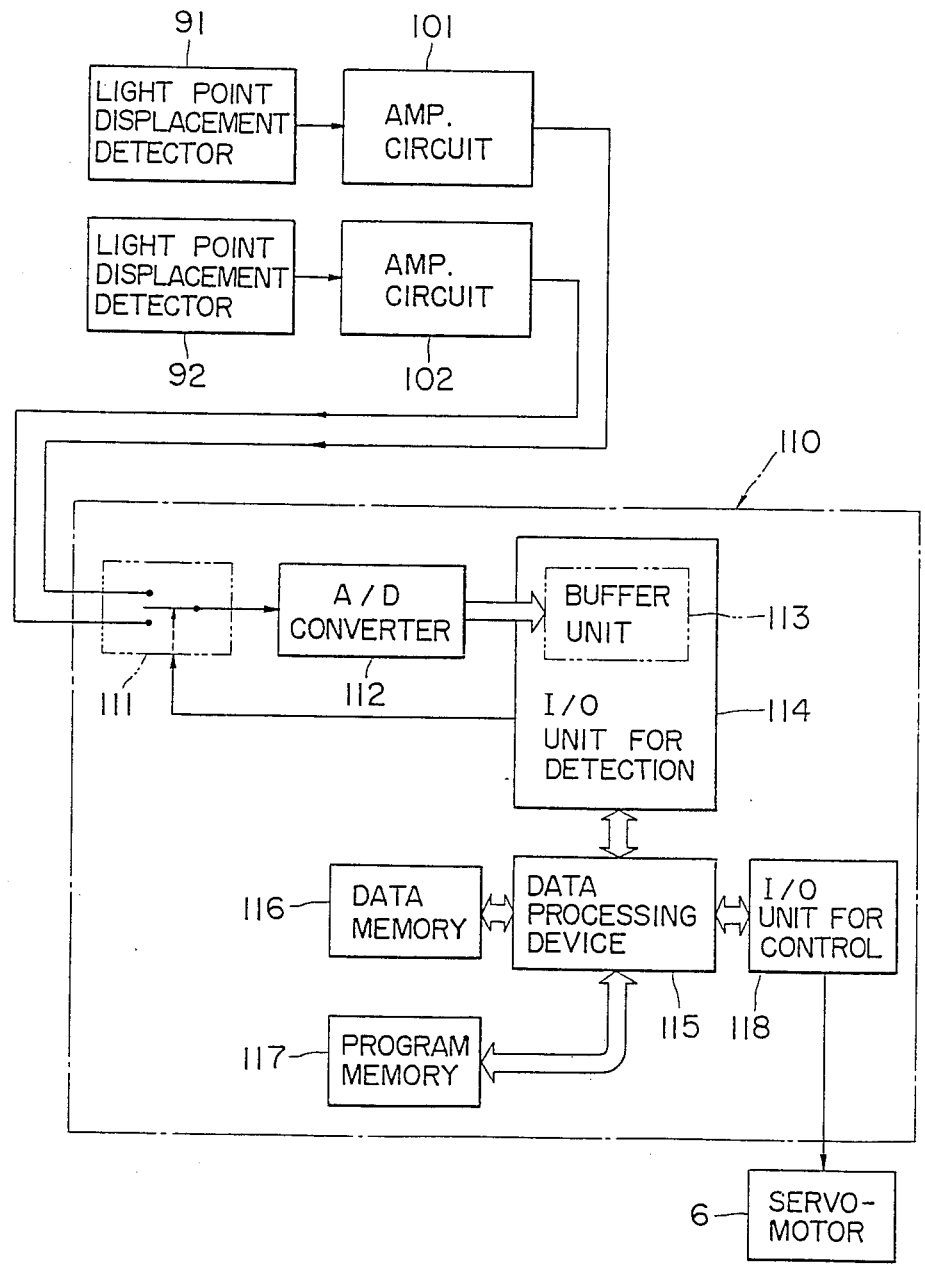
FIG. 17 is a block diagram showing a ninth example of the invention.

In the above described seventh and eighth examples, the detection of the inclination of the column 2 is made possible by the two combinations of the lenses 81 and 82 and their respective light point displacement detectors 91 and 92. In a ninth example as illustrated in FIG. 17, a numerical control (NC) system 110 is used as a control device 11, and the inclination of the column 2 is calculated on the basis of the outputs of the two light point displacement detectors 91 and 92. Thus, correction for the relative displacement of the table 3 and the main spindle 5 can be accomplished with higher precision.

Referring to FIG. 17, the light point displacement detectors 91 and 92 are so adapted that, by an arrangement similar to those in the preceding seventh and eight examples, they can produce as output displacements $D_{11}$ and $D_{12}$ of the light source image at respectively different positions of the main spindle head 4. These detectors 91 and 92 are connected via amplifying circuits 101 and 102, respectively, to respective input terminals of a selector 111 of the above mentioned NC system 110.

In this NC system 110, the amplified detection signal selected by the selector 111 is fed into an A/D converter 112, whose output is supplied to a buffer unit 113 within an I/O unit for detection 114. In accordance with the demand of this I/O unit for detection 114, writing-in or reading-out operation becomes possible.

The I/O unit for detection 114 is connected on its output side to an data processing device 115 and the selector 111 and, in conformance with the demand of the data processing device 115, sends a corresponding selection command to the selector 111 thereby to appropriately switch to the selected signal. At the same time, the signal which has been selected by the selector 111 and encoded by the A/D converter 112 is held in the buffer unit 113.

The data processing device 115, which is a device such as a microprocessor or a minicomputer, is provided with a data memory 116 and a program memory 117 and is connected by way of an I/O unit for control 118 to a servomotor 6 as described hereinbefore. This data processing device 115 operates to carry out a specific processing on the basis of a program stored in the program memory 117 and to control the operations of the I/O unit 114 for detection, the I/O unit for control 118, and other components. At the same time, this data processing device 115 carries out specific computation by using data stored in the buffer unit 113 and the data memory 116 and, in conformance with the computed results, transmits a control signal to the I/O unit for control thereby to control the servomotor 6.

An operation command device (not shown) such as a control panel or an NC system is connected to the I/O unit for control 118, which operates in response to the command from this operation command device to cause the servomotor 6 to operate thereby to cause the machine tool to undergo its fundamental operation.

In the instant example, the operation of the NC system 110 is as follows. In this connection, the following actions are carried out on the basis of control by the data processing device 115, which operates in accordance with the procedures stored as a program within the program memory 117.

Prior to the correction operation of the NC system 110, the relative displacement of the table 3 and the main spindle 5 is measured beforehand with the machine tool in a state, such as the start of its operation, wherein thermal deformation has not yet occurred.

Then, the relative displacement $D_{11}$ of the table 3 and the main spindle 5 when the distance between the light source 71 or 7 and the lens 81 is $L_{01}$ as shown in FIG. 12 or FIG. 15 is first detected. In compliance with a command from the data processing device 115, the I/O unit for detection causes the selector 111 to change over to the side of the light point displacement detector 91, which thereupon detects the displacement of the light source image and generates a detection signal. This signal is amplified in the amplifying circuit 101, encoded in the A/D converter 112, and held in the buffer unit 113. The data processing device 115 thereupon computes the relative displacement $D_{01}$ of the table 3 and the main spindle 5 according to a procedure based on the content held in the buffer unit 113 and the Equation (5) stored in the program memory 117 and holds this relative displacement $D_{01}$ in the data memory 116.

Next, the relative displacement $D_{12}$ of the table 3 and the main spindle 5 at the time when the distance between the light source 72 or 7 and the lens 82 is $L_{02}$ as shown in FIG. 13 or FIG. 16 is detected. In response to a command from the data processing device 115, the I/O unit for detection 114 switches the selector 111 to the side of the light point displacement detector 92, which detects the relative displacement $D_{12}$ and generates a detection signal, which is amplified in the amplifying circuit 102, encoded in the A/D converter 112, and held in the buffer unit 113. The data processing device 115 then computes the relative displacement $D_{02}$ of the table 3 and the main spindle 5 in conformance with the contents held in the buffer unit 113 and the procedure based on the Equation (6) and stored in the program memory 117 and holds the displacement $D_{02}$ thus obtained in the data memory 116. The relative displacements $D_{01}$ and $D_{02}$ thus detected are as indicated in FIG. 18.

Figures 18, 19:
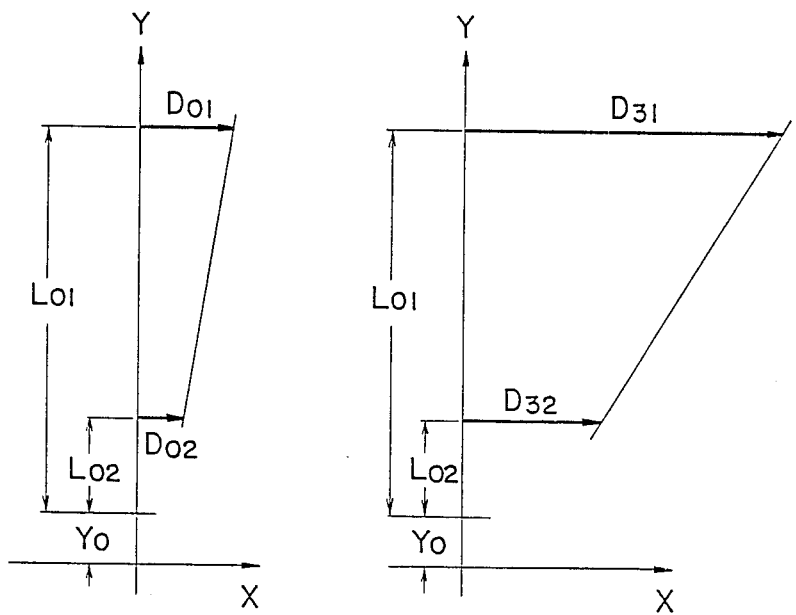
FIG. 18 is a geometric diagram indicating the detection state in the same ninth example when there is no thermal deformation.
FIG. 19 is a similar diagram indicating the detection state in the same ninth example when there is a thermal deformation.

In FIG. 18 the Y axis is in the direction of ascent and descent of the main spindle head 4, while the X axis is in the direction (horizontal) of movement of the table 3. $D_{01}$ and $D_{02}$ are relative displacements of the table 3 and the main spindle 5 measured in the X-axis direction, and $Y_0$ is the distance from the origin of the Y axis to the position of the lens.

On the other hand, the NC system 110 operates, when thermal deformation occurs in the machine tool during its operation, to measure the relative displacement of the table 3 and the main spindle periodically or whenever correction is necessary such as before precision machining and to compute the quantity of correction for compensating for the inclination of the column 2.

First, by the same procedure as that at the time of no thermal deformation, the relative displacement $D_{31}$ of the table 3 and the main spindle 5 at the time when the distance between the light source 7 or 71 and the lens 81 is $L_{01}$ and the relative displacement $D_{32}$ at the time when that distance is $L_{02}$ are detected and respectively held in the data memory 116. These relative displacements $D_{31}$ and $D_{32}$ thus detected are as indicated in FIG. 19.

Then the relative displacements $D_{01}$ and $D_{02}$ previously measured with the machine in the state of no thermal deformation and the relative displacements $D_{31}$ and $D_{32}$ with the machine in the thermally deformed state are compared, and the increments of the relative displacements at the respective measurement positions are calculated as follows.

$$\Delta D_1 = D_{31} - D_{01} \qquad (8)$$

$$\Delta D_2 = D_{32} - D_{02} \qquad (9)$$

Figure 20:
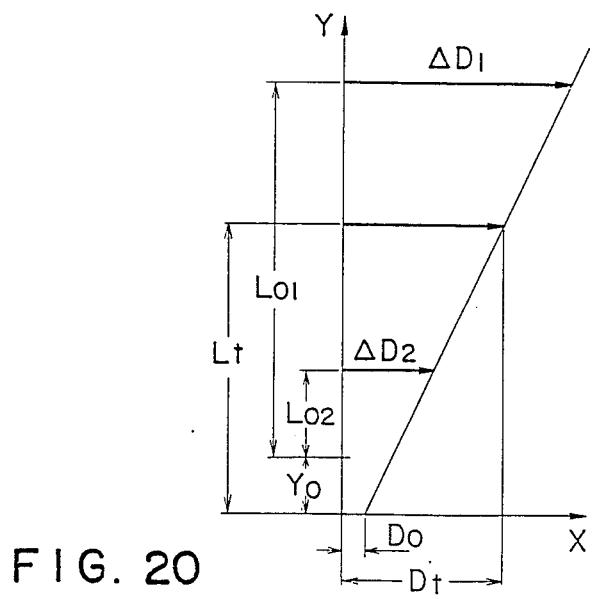
FIG. 20 is a geometric diagram indicating the inclination of the column caused by thermal deformation as detected by the same ninth example.

At this time, the inclination of the axis which has increased with the thermal deformation can be represented graphically by the inclination of a straight line as shown in FIG. 20. This straight line can be represented analytically by the following equation.

$$Y = \frac{L_{01} - L_{02}}{\Delta D_1 - \Delta D_2}(X - \Delta D_2) + L_{02} + L_0 = A \cdot X + D_0, \qquad (10)$$

where $$A = \frac{L_{01} - L_{02}}{\Delta D_1 - \Delta D_2}$$

$$D_0 = L_{02} + L_0 - \frac{L_{01} - L_{02}}{\Delta D_1 - \Delta D_2} \Delta D_2$$

On the other hand, in the case where the minimum correction quantity desired when the NC system 110 is to carry out correction in the X-axis direction is set at $\Delta X$ (for example, 0.001 mm), the standard correction quantity $\Delta Y$ in the Y-axis direction corresponding to this $\Delta X$ is given by $$\Delta Y = \Delta X \cdot A \qquad (11)$$

On the basis of Equation (10), the stationary correction quantity $D_t$ in the X-axis direction corresponding to the Y-axis position $L_t$ at present is expressed as follows.

$$D_t = A \cdot L_t + D_0 \qquad (12) \text{ ps}$$

These values are stored in the data memory 116 and are referred to at the time of correction operation.

After the standard correction quantity $\Delta Y$ and the stationary correction quantity $D_t$ have been calculated as described above, the NC system 110 carries out correction in the following manner of the relative displacement of the table 3 and the main spindle 5 due to thermal deformation.

First, in the initial movement after the above described calculation, the movement is carried out by subtracting the stationary correction quantity $D_t$ corresponding to the position of the main spindle from the movement quantity in the X-axis direction based on the movement command, and the basic correction of the coordinate system of the table 3 and the main spindle 5 is carried out.

Thereafter, each time the variation of the position $L_t$ in the Y-axis direction becomes a distance which is an integral multiple of the standard correction quantity $\Delta Y$ as a result of movement, correction of the relative displacement accompanying ascent or descent of the main spindle head 4 due to the inclination of the axis of the column 2 is carried out. More specifically, when the main spindle head 4 ascends, that is, when the movement is in the direction which causes the above mentioned $L_t$ to increase, the minimum correction quantity $\Delta X$ is subtracted from the position $D_t$ in the X-axis direction each time the variation of the position $L_t$ becomes a distance which an integral-number multiple of the standard correction quantity $\Delta Y$. On the other hand, when the main spindle head 4 descends, that is, when the movement is in the direction causing $L_t$ to decrease, the minimum correction quantity $\Delta X$ is added to the position $D_t$ in the X-axis direction each time the variation of the position $L_t$ becomes a distance which is an integralnumber multiple of the standard correction quantity $\Delta Y$.

According to the instant example as described above, the NC system 110 operates to correct operational quantities during the operation of the machine tool, whereby the relative displacement of the table 3 and the main spindle 5 in a state wherein thermal deformation has occurred is corrected, and accurate and positive operation can be accomplished.

Furthermore, according to the instant example, the inclination of the axis of the column 2 of the machine tool is detected, and, in correspondence to the variation of the relative displacement of the table 3 and the main spindle 5 accompanying ascent or descent of the main spindle head 4, an even more accurate and positive correction can be carried out.

Figure 21:
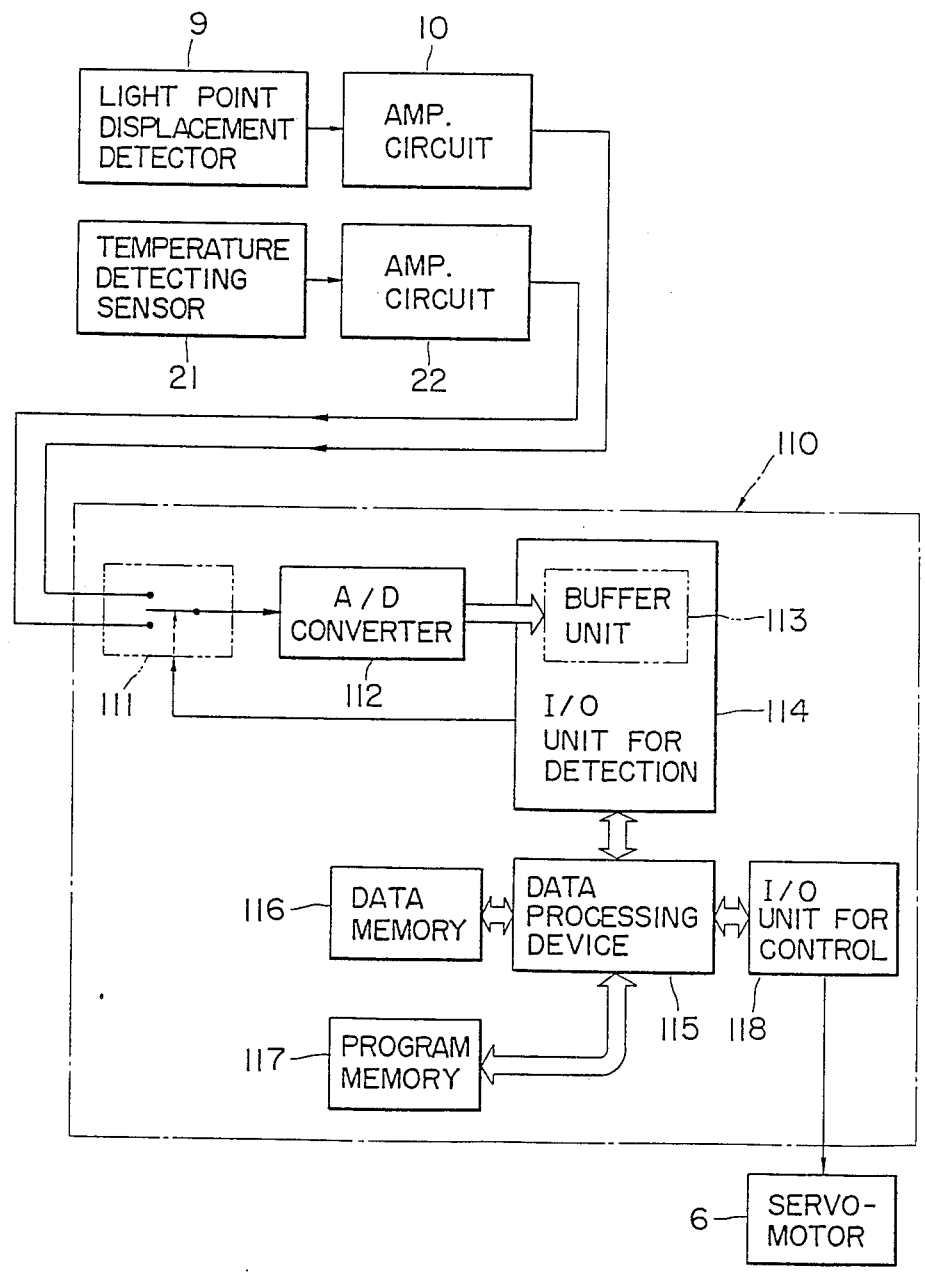
FIG. 21 is a block diagram showing a tenth example of the invention.

In the above described ninth example, two light point displacement detectors 91 and 92 connected to the NC system 110 are provided. In a tenth example, as illustrated in FIG. 21, in addition to one light point displacement detector 9, a temperature detecting sensor 21 is used as temperature detecting means in the machine tool. Thus, in addition to carrying out correction on the basis of the detector 9, supplementary correction is carried out on the basis of temperature rise in the machine tool detected as in the prior art, whereby accurate and positive correction of the relative position of the table 3 and the main spindle is accomplished.

Figure 22:
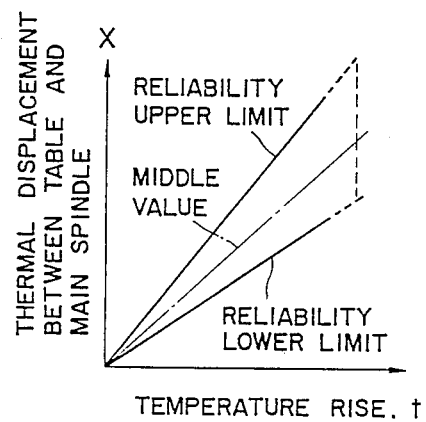
FIG. 22 is a graph indicating the relationship between temperature rise and thermal deformation in the same tenth example.

Because of the existence of a proportional relation to a certain degree between thermal displacement of a machine tool and temperature rise thereof, it has been a practice to detect the temperature rise of the main structure of a machine tool and to carry out correction by causing the coordinate system of the machine tool to move according to the temperature rise. However, since this temperature rise varies depending on the machine operational conditions, thermal influences such as the cutting fluid, and the environmental conditions of the machine, the reliability of detection methods dependent thereon is poor. As indicated in FIG. 22, a correction based on such temperature rise, in general, has the characteristic of its inaccuracy increasing with temperature rise. This relationship between temperature rise t and thermal displacement x can be expressed by the following equation.

$$x = B_t + C \qquad (13)$$

Figure 23:
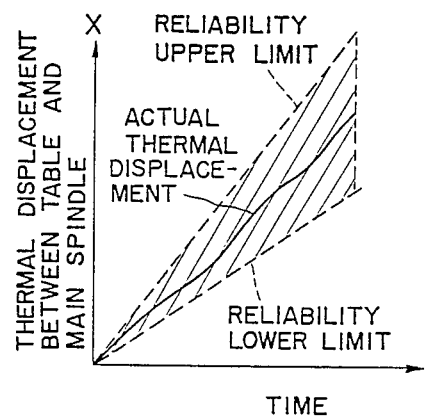
FIG. 23 is a graph indicating the relationship between time and thermal deformation in the same tenth example.

That is, if the thermal displacement of a machine tool is estimated on the basis of only the temperature, the conditions whose relationship is being sought may be in a state approaching the upper limit of reliability in FIG. 22, or they may be the operational conditions or environment of the machine in a state approaching the lower limit of reliability, wherein deviations and errors will arise in a range as indicated in FIG. 23, whereby accuracy and positiveness will be lost.

Figure 24:
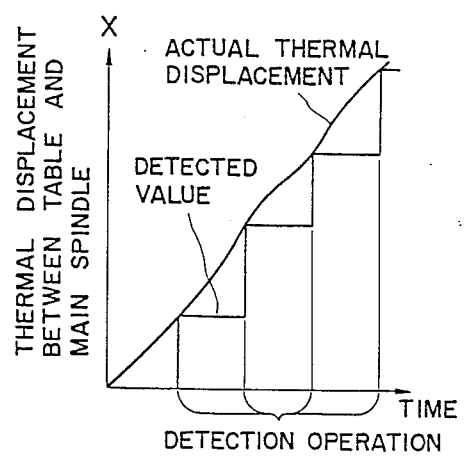
FIG. 24 is a graph indicating correction of thermal displacement by a light point displacement detector in the same tenth example.

On the other hand, by the method of detecting the relative displacement of the table 3 and main spindle 5 by means of a light point displacement detector 9 and carrying out correction, correction can be accomplished irrespective of the rise in temperature of the machine tool. However, when correction is carried out by using the detector 9, it is extremely accurate immediately after detection and correction, but, with the passage of time, errors increase as indicated in FIG. 24. For this reason, it has been necessary to carry out detection and correction each time immediately before machining requiring precision such as finishing.

Accordingly, in the instant tenth example, as shown in FIG. 21, a light point displacement detector 9 connected via an amplifying circuit 10 to the NC system 110 is provided, and, at the same time, a temperature detecting sensor 21 as temperature detection means mounted in the machine tool is additionally provided and connected via an amplifying circuit 22 to the NC system 110. Here, the NC system 110 is of an organization similar to that in the preceding ninth example, and therefore detailed description thereof will not be repeated. The operation of the NC system 110 is carried out by the data processing device 115 according to procedure stored in the program memory 117 as a program.

Figure 25:
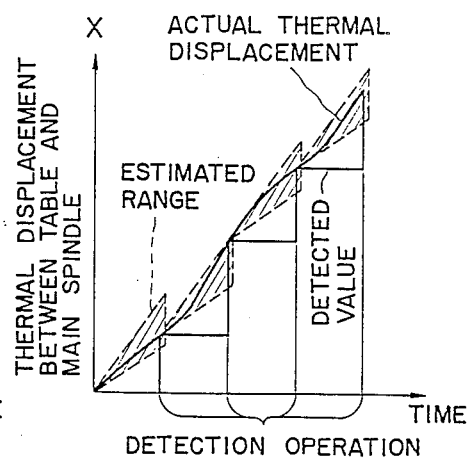
FIG. 25 is a graph indicating correction of thermal displacement by mean of a combination of a light point displacement detector and a temperature detecting sensor in the same tenth example.

In the example described above, basic correction is carried out at the time of precision machining or by suitable detection and correction of relative displacement of the table 3 and the main spindle 5 by means of the light point displacement detector 9. At this time, the NC system 110 is in a state wherein the selector 111 is on the side of the light point displacement detector 9 and compute the relative displacement according to the specific computation described hereinbefore. In the time interval from one instant of detection to the succeeding instant of detection with the detector 9, errors increase with elapse of time. Then the NC system 110 switches the selector 111 to the side of the temperature detecting sensor 21 and carries out correction on the basis of the temperature thus detected by the sensor 21. More specifically, the NC system 110 measures beforehand the temperature of the machine tool while the light point displacement is being detected by the detector 9, then calculates the variation with time of the temperature detected by the sensor 21, carries out a specific computation in accordance with this temperature variation, and carries out correction thereby to establish the limits of the range of error as indicated in FIG. 25.

Thus an advantageous feature of the instant tenth example is that it is possible to hold errors at a minimum even when the time interval of the operation of detection by the light point displacement detector 9 and correction is lengthened, whereby the frequency of the operation of detection by means of the detector 9 and correction can be reduced and the working time of the machine tool increased, thus improving the work efficiency.

While, in the example as described above, the correction according to temperature variation detected by the temperature detecting sensor 21 has been described as being obtained by a specific computation, it is also possible to store beforehand in a memory such as the data memory 116 a standard correction value in accordance with the temperature as a data table and then to read out this value as needed.

In each of the above described examples of the correction system according to this invention, the table 3 is driven by the servomotor 6 on the basis of the detected relative displacement of the table 3 and the main spindle 5, and the resulting movement of the table 3 in the horizontal direction is thus controlled thereby to correct the relative displacement of the table 3 and the main spindle 5. However, in a machine tool of the type wherein machining is carried out by moving the column 2 on which the main spindle 5 is rotatably mounted, correction can be imparted by adapting the column 2 to be moved by the servomotor 6. Essentially, the object of accurate machining is achieved as long as the relative positions of the table 3 and the main spindle can be corrected.

Furthermore, the mounting positions of the lenses 8, 81, and 82 and the light point displacement detectors 9, 91, and 92 need not be limited to a side face of the table 3 as described above. For example, these lenses and detectors may be imbedded in the surface of the table 3 or they may be fixedly mounted on any part of the table 3 provided that they will not obstruct or inconvenience mounting and dismounting of the workpiece 13 and the machining work.

Thus, it is to be understood that this invention is not intended to be limited to the examples described above and the details set forth therein and that numerous modifications and changes thereof are within the purview of this invention. The essential and requisite characteristic of the correction system according to this invention is that it comprises a light source 7 provided near the main spindle 5 of the machine tool, a lens 8 provided on table 3 for directing light from the light source 7 to form a point image of the light source, a light point displacement detector 9 for detecting variation of position of the light point image thereby to directly detect optically displacement in the relative positional relationship between the table 3 and the main spindle 5 and generating a corresponding detection signal, a control device 11 for operating in response to the detection signal to generate a control command signal, and driving means 6 operating in response to the control command signal to drive the table 3 thereby to correct the machining operation in accordance with the detected displacement.

Thus a meritorious effect of the system according to this invention for correcting thermal displacement of a machine tool is that a displacement in the relative positional relationship between the main spindle and the table of a machine tool is directly detected, and, on the basis of this displacement, the relative positional relationship between the main spindle and the table can be corrected with greater accuracy and positiveness than heretofore. Furthermore, since a light source emitting diffused light is used, effects due to shimmering of air can be eliminated.

What is claimed is:

1. A correction system for compensatively correcting for thermal displacement in a machine tool of the type having a column, a main spindle head ascendably and descendably supported on the column, a main spindle rotatably supported on the main spindle head and having means for holding a machining tool, and a table for holding a workpiece to be machined by the tool, said correction system comprising:
    at least one light source mounted on the main spindle head in the vicinity of the main spindle and operating to emit diffused light;
    at least one lens mounted on the table in a state apart from and facing said at least one light source and functioning to receive said diffused light and to form an image of said at least one light source;
    at least one light point displacement detector for detecting a variation of a position of the light source image of said at least one light source and generating a corresponding detection signal;
    an amplifying circuit for amplifying said detection signal; and
    a control means operating to determine, from the signal thus amplified, any relative displacement of the table and the light source and, on the basis of said relative displacement, to correct the relative position of the table and the main spindle.

2. A correction system as claimed in claim 1 in which said light source is on occulting light source emitting the light intermittently at a specific frequency, and said amplifying circuit comprises a selective amplifying circuit for amplifying only a signal component of the same frequency as the intermittent emission of the light source and a synchronous rectifying circuit for rectifying only a signal component with a synchronous relationship to the intermittent emission of the light source.

3. A correction system as claimed in claim 1 wherein said light point displacement detector is a divided photodiode detector having a divided detecting surface for detecting light point positions.

4. A correction system as claimed in claim 1 wherein said light point displacement detector is a continuous photodiode detector having a continuous detecting surface for detecting light point positions.

5. A correction system as claimed in claim 1 further comprising a plurality of lenses and a plurality of light point displacement detectors respectively associated with said plurality of lenses and providing respective detection signals, said control means determining from said respective detection signals the inclination of the axis in the ascending and descending direction of the main spindle head relative to said table.

6. A correction system as claimed in claim 5 comprising two lenses and two said light point displacement detectors respectively associated with said lenses, each lens and respective light point displacement detector forming a lens/detector combination.

7. A correction system as claimed in claim 6 in which said lens/detector combinations are so disposed that the optical axes thereof intersect perpendicularly, and a half mirror is disposed with the plane thereof passing through the intersection point of said optical axes and is oriented to be at an angle of 45 degrees relative to each said optical axes.

8. A correction system as claimed in claim 1 in which said control means is a numerical control system comprising means for determining, from said detection signal from the light point displacement detector, relative displacement of the table and the main spindle and inclination of the axis of the column in the direction of ascent and descent of the main spindle head, and correction means for correcting relative movement of the table and the main spindle in accordance with said relative displacement and said inclination thus determined.

9. A correction system as claimed in claim 1 further comprising temperature detecting means for detecting the temperature of a specific part of the machine tool and wherein said control means is a numerical control system comprising first means for determining, from said detection signal from the light point displacement detector, relative displacement of the table and the main spindle, second means for determining relative displacement of the table and the main spindle in accordance with variation in said temperature thus detected, and correcting means for correcting relative movement of the table and the main spindle in accordance with the relative displacements respectively determined by the first and second determining means.

* * * * *